Aug. 6, 1935.                    C. PLEUTHNER                    2,010,274
PRICE SIGN
Filed Dec. 4, 1933                                 2 Sheets-Sheet 1
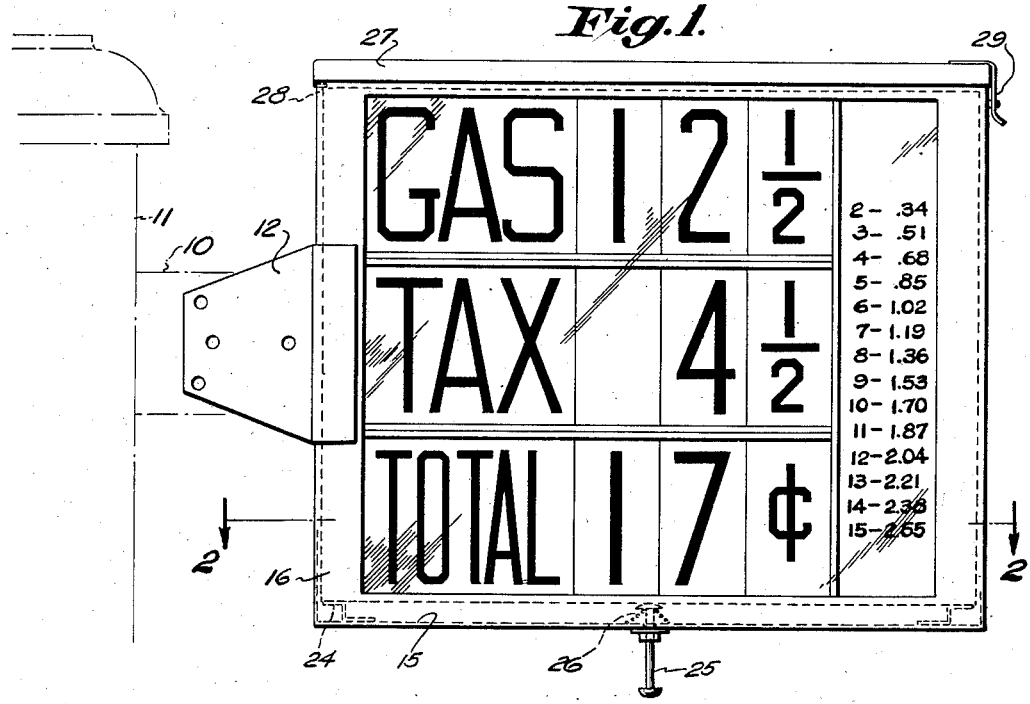
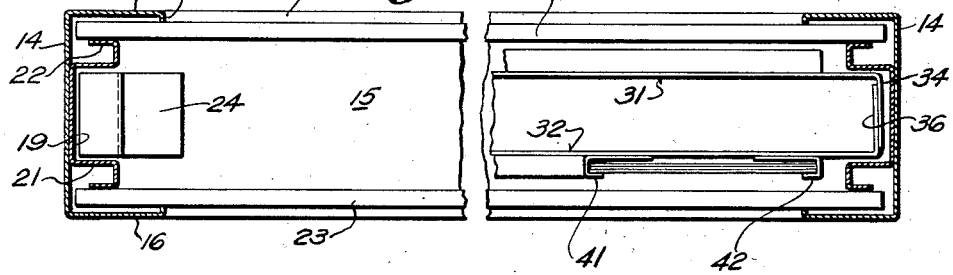
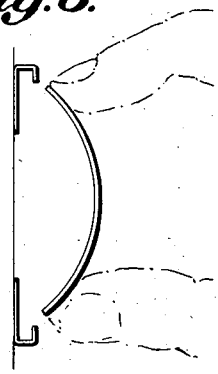
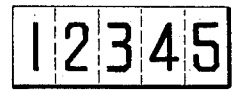
Inventor
Charles Pleuthner
By Albert R. Henry
Attorney Aug. 6, 1935. C. PLEUTHNER 2,010,274
PRICE SIGN
Filed Dec. 4, 1933 2 Sheets-Sheet 2
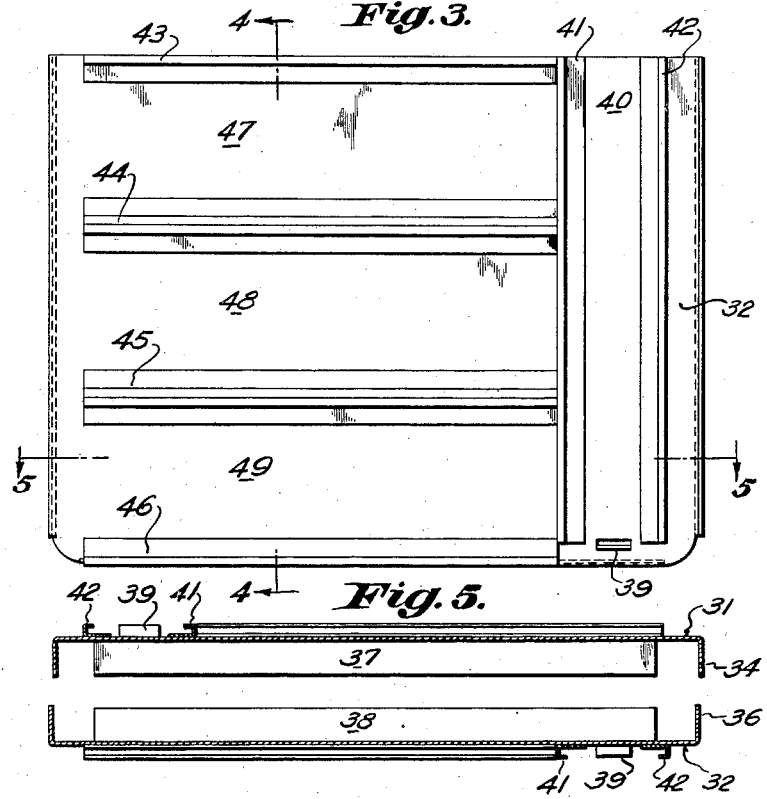
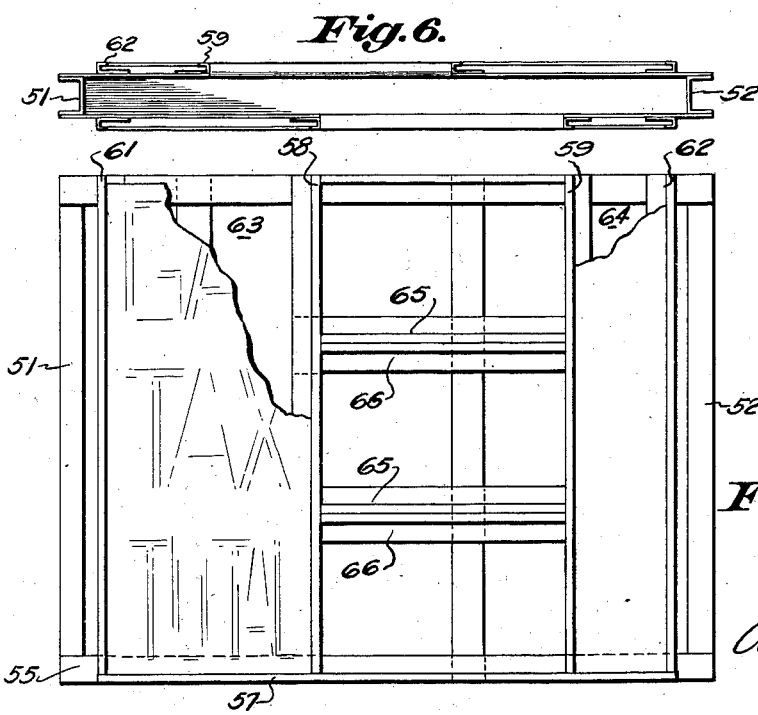
Inventor
Charles Pleuthner
Albert R. Henry
Attorney Patented Aug. 6, 1935

2,010,274

UNITED STATES PATENT OFFICE 2,010,274

PRICE SIGN

Charles Pleuthner, Buffalo, N. Y., assignor, by mesne assignments, to Martin & Schwartz, Inc., Buffalo, N. Y., a corporation of New York Application December 4, 1933, Serial No. 700,803

3 Claims. (Cl. 40—64)

This invention relates to price signs, and it has particular reference to a price display structure utilizing interchangeable price indicia, so organized as to permit of a maximum number of price changes with a minimum of manual operations and material.

More particularly, the invention contemplates a price sign applicable to the display of retail sales prices for commodities such as gasoline, which is sold to motorists whose automobiles are drawn up along side of the dispensing pump. It is desirable, in such instances, to display the prices on either side of the pump, and to show not only the total price per gallon, but the total price for a plurality of gallons, and the proportion of the price assessed to taxes. Gasoline fluctuates in price from day to day, and the fluctuations may be in fractions of a cent, with the result that a large number of separate cards would be required to show, on each card, all the variations in total price which might be encountered in normal business.

In order to provide for the necessary range of price changes, the present invention contemplates a card holding frame formed with a number of card holding means, such as flange members, some of which are arranged in a vertical manner, and others of which are disposed horizontally, to hold respectively individual cards bearing suitable word or number designations. Typical embodiments of the invention are illustrated in the accompanying drawings, wherein:

Fig. 1 is an elevation of the assembled sign, mounted on a gasoline dispensing pump casing;

Fig. 2 is a section along the line 2—2 of Fig. 1, with parts of the removable card holder broken away to show the casing structure;

Fig. 3 is an elevation of the card holder, removed from the outer casing;

Fig. 4 is a section along the line 4—4 of Fig. 3;

Fig. 5 illustrates a section along the line 5—5 of Fig. 3, with the portions of the card holder separated to show more clearly the bottom flange construction;

Fig. 6 is a top plan view of a holder of modified construction;

Fig. 7 is an elevation of the holder shown in Fig. 6;

Fig. 8 is a diagram illustrating the method of inserting the cards in the card holders; and, Fig. 9 is a plan view, on a reduced scale, of a number of cards as they appear during one stage of their manufacture.

As indicated in Fig. 1, the price sign is adapted to be secured to a bracket 10, projecting from the pump casing 11, by means of a clevis 12 which is welded or otherwise secured to one edge of the sign. The sign comprises an outer casing designated generally by the reference numeral 13, and having three substantially continuous sides, such as the end walls 14 and the bottom wall 15. The side faces 16 of the casing are formed with a continuous perimeter, but they are cut away within the marginal portions to provide apertures 17 which are defined by inturned flanges 18 adapted to hold the cover glasses in place. There is thus provided a five-sided box, having windows or openings on opposed sides, through which the cards may be observed, and one open edge or top, through which the cards may be removed or inserted.

The method of forming the casing 13 is not here significant, but may follow any of the known practices of the art. Thus, the sides 15 may be stamped from sheet metal, and two of such sides may be joined together, or a number of separate pieces may be pre-formed and subsequently assembled.

Vertically disposed flanged members 19 are secured within the casing 13 to the end walls 14 thereof to form a guide for a removable card holder and to secure panes of glass over the casing apertures 17. The guides are formed by inwardly projecting flanges 21, which terminate within the edges of the apertures 17, and which merge into reversely bent flanges 22 spaced from the flanges 18. Panes of glass 23 are mounted within the casing 13, between the flanges 18 and 22, to cover the apertures 17 and prevent the ingress of dirt and moisture.

A pair of steps 24 are positioned in the corners of the casing 13, on the bottom portion 15, to serve as rests for a removable card holder, the structure of which will shortly be described. An ejecting plunger 25 is positioned in a small aperture formed in the bottom member 15, and is normally buoyed up to a point just above the level of the steps 24 by a coiled spring 26, interposed between the inner head of the plunger and the bottom 15. When the card holder is dropped into the casing 13, between the guides 21, the resiliently mounted plunger 25 breaks the force of the drop, and allows the card holder to come to rest on the steps 24 without undue shock. The casing is completed by a cover 27, formed at one end with a tongue 28, adapted to enter a slot formed in one end wall 14, and provided at the other end with a spring clip 29 adapted to rest against the opposed end wall.

The casing 13 constitutes a suitable receptacle for a card holder, the details of which are shown more clearly in Figs. 3 to 7. In the form shown in Figs. 3, 4, and 5, the structure includes a pair of sheet metal plates 31 and 32, each of which is bent along three edges to provide vertical flanges 33 and 34, and 35 and 36, respectively, and bottom flanges 37 and 38. The plate 32 (and the plate 31, in symmetrical relation), is formed with a struck-out flange 39 adjacent the lower right hand corner, to form a card supporting ledge. Vertical flange members 41 and 42 having a channel-shaped cross section are secured to the plate 32, on either side of the flange 39, thereby providing a vertical card holding pocket 40, open at its upper end, to receive one or more cards. A number of similar flange members 43, 44, 45, 46 are secured in horizontal lines over the remaining face of the plate 32, to provide a series of pockets 47, 48, and 49, adapted to receive other cards. As will be apparent from a conjoint consideration of Figs. 1 and 3, the several flange members are so positioned on the face of the plates 31 and 32 as to hold the cards in line with the apertures 17.

As shown in Fig. 4, the plates 31 and 32 are assembled in spaced relation, to provide therebetween a compartment in which reserve cards may be stored. Or, if desired, the reserve cards may be stored between the appropriate flange members, in back of the card being displayed.

Referring now to Fig. 1, it will be understood that the view shows the card holder in the outer casing 13, with the cards properly arranged in the various pockets 40, 47, 48, and 49. The card exposed in the pocket 40 may be referred to as the calibration or totalizing card, and on it is printed the multiples of the price per gallon, as determined from the remaining indicia. As a different totalizing card is required for every change in price, the several multiples are all printed on a single card. The cards disposed in aligned rows in the horizontal pockets show, to the right, the numerical price values in fractions, units, and tens, and it will be apparent that a price change of a fraction of a cent would ordinarily require simply a change of two of these figures, to present the new total price, and would less frequently require a change in the tens column. For this reason, the horizontal arrangement of the card holding pockets, and the printing of the numbers on separate cards, minimizes the number of cards required to cover a given range of prices, and facilitates the work of making the change. The cards to the left indicate the significance of the several numerical items entering into the price per gallon, and are made separate from the number cards, since these cards are changed less frequently. Thus, in some localities, it might be desirable to change the "tax" legend to read "State tax" or "discount for cash", or some other legend, in which event only one change need be made in the legend cards.

The card holder shown in Figs. 6 and 7 differs from that shown in the preceding embodiment, in the provision of an additional vertical pocket and in the construction of the holder from channel stock, thereby diminishing the weight. The ends 51 and 52 and the bottom portion 53 of the holder are formed of a continuous length of channel stock, whose flanges are utilized to secure the remaining elements. Other channel or L-section members are then secured to the flanges of the ends 51 and 52, those at the top being designated by the numeral 54, while those at the bottom are indicated by the numeral 55. It will be observed that the flange 56 of the member 54 is cut away for appreciable distances on either side of the center of the frame, while the flange 57 of the lower member 55 is cut away only at the extreme ends. Vertical L-sections 58 and 59 are secured between the webs of the members 54 and 55, on either side of the flange 56, and similar sections 61 and 62 are secured to the webs of the members 54 and 55, in spaced relation to the sections 58 and 59, thereby providing a pair of vertically disposed card pockets, 63 and 64. The space between the superimposed L-sections 56 and 57 is divided into a plurality of horizontally arranged pockets, by other L-sections 65, 66, which are placed back to back and which are secured, on their long flange portions, to the vertical members 58 and 59.

It will be observed that the arrangement of the various pocket-defining sections on either face of the card holder is in reverse order from the arrangement on the opposite face, but otherwise the structure is the same. This reversal, of course, presents the cards in the same order, irrespective of which side of the sign is observed.

In using this form of card holder, the pocket 63 is adapted to receive a single card, upon which is printed a number of words, such as "gas", "tax", and "total", and which card, as it may be assumed, is changed only at very infrequent intervals. The pocket 64 is adapted to receive the calibration or totalizing card, as in the case of the previous embodiment. The superimposed pockets defined by the horizontal rails are intended to receive a number of separate cards, each bearing an individual number, and which may be changed as occasion requires. The long vertical cards, such as the calibration cards, may be stored within the holder, while the various small number cards not in use may be held in back of the one being displayed.

The small number cards are shown more particularly in Figs. 8 and 9. Fig. 8 illustrates the mode of inserting a card between the opposed flanges, by flexing the card and snapping it into place. The single card shown may also be regarded as a stack of separate cards, all of which may be simultaneously inserted into the pocket, if the card stock is sufficiently flexible. This method of inserting or removing the small cards has some advantages over the method of sliding the cards in from the edge of the pocket, as in the latter case, the corners of the cards are apt to become "dog-eared", or to slip out from one flange or the other.

Fig. 9 shows, on a small scale, a step in the manufacture of the cards, which, as it will be noticed, are all of the same size, so that they may be readily interchanged and aligned. The odd numbers are printed on one face of the card, at regular intervals, while the even numbers are printed on the opposite face. The numbers are then separated along the dash lines by a cutting operation, if it is desired to use detached cards, or, the large card is scored along the dash lines, if it is desired to fold the card to display any given number, while maintaining the unity of the strip.

From the foregoing description, it will be understood that the invention provides a card holder suitable for use in displaying the sales price of gasoline, which is subject to price fluctuations, and wherein a plurality of number cards are so arranged and mounted as to facilitate the display of the price changes. It will also be understood that a greater number of changes may be made from a given group of numbers, than would be the case if the numbers in any column or row were printed on the card for simultaneous display.

I do not claim broadly the provision of a card sign, or a display sign having a removable card holder with a plurality of pockets formed therein, but I do claim, and broadly within the scope of the principles set forth above, my invention as described by the following claims.

I claim:

1. In a card displaying sign, a rectilinear casing having side and bottom portions, spaced side walls, and an open top, a removable card holding frame adapted to be inserted and removed through said top, and an ejecting plunger movably mounted in the bottom portion of the casing to serve as a stop for the holder when said holder is inserted in the casing, and to facilitate removal of said holder from said casing.

2. In a card displaying sign, a rectilinear casing having three closed sides and an open side interconnected by apertured faces, a card holder movable into and out of said casing through the open side thereof, a movable plunger mounted in the side of the casing opposite said open side, and a spring for normally holding said plunger within the casing, whereby said plunger may act as a bumper for the card holder when the holder is inserted in the casing, and facilitate the ejection of the holder from said casing, and a cover plate for said open side.

3. In a card displaying sign, a rectilinear casing formed with windows on opposite sides and having an open edge, a removable card holder insertible in the casing through the open edge thereof and comprising a pair of similar rectangular plates each having integral flanges on three marginal sides, a pair of flange members secured to each plate in spaced relation and disposed thereon in parallelism to and adjacent to one margin, other pairs of flange members secured to each plate in parallelism to an adjacent margin of the plate, the integral flanges of the plates being secured together to provide a boxlike structure with the flange members disposed on the exterior thereof, said pairs of flange members being adapted to receive character bearing cards therebetween for display through the windows of the casing.

CHARLES PLEUTHNER.